(12) United States Patent
Cao et al.

(10) Patent No.: US 10,277,326 B2
(45) Date of Patent: Apr. 30, 2019

(54) TUNABLE OPTICAL CHANNEL SLICING AND STITCHING TO ENABLE DYNAMIC BANDWIDTH ALLOCATION

(71) Applicant: University of Southern California, Los Angeles, CA (US)

(72) Inventors: Yinwen Cao, Los Angeles, CA (US); Alan Willner, Los Angeles, CA (US)

(73) Assignee: UNIVERSITY OF SOUTHERN CALIFORNIA, Los Angeles, CA (US)

(*) Notice: Subject to any disclaimer, the term of this patent is extended or adjusted under 35 U.S.C. 154(b) by 0 days.

(21) Appl. No.: 15/890,211

(22) Filed: Feb. 6, 2018

(65) Prior Publication Data

US 2018/0227071 A1 Aug. 9, 2018

Related U.S. Application Data

(60) Provisional application No. 62/456,517, filed on Feb. 8, 2017.

(51) Int. Cl.
| | |
|---|---|
| H04B 10/50 | (2013.01) |
| H04J 14/02 | (2006.01) |
| H04B 10/572 | (2013.01) |
| H04B 10/2507 | (2013.01) |

(52) U.S. Cl.
CPC ....... *H04B 10/506* (2013.01); *H04B 10/2507* (2013.01); *H04B 10/572* (2013.01); *H04J 14/0265* (2013.01); *H04J 14/0298* (2013.01)

(58) Field of Classification Search
None
See application file for complete search history.

(56) References Cited

U.S. PATENT DOCUMENTS

2013/0294777 A1* 11/2013 Willner ................. H04J 14/002
                                                              398/78
2014/0233957 A1* 8/2014 Watanabe ................ H04B 3/32
                                                              398/91

* cited by examiner

*Primary Examiner* — Casey L Kretzer
(74) *Attorney, Agent, or Firm* — Snell & Wilmer LLP

(57) ABSTRACT

A method for transmitting an optical signal through a first channel and a second channel includes coupling the optical signal with a first pair of comb lines separated by a spacing frequency to create an optical signal copy that is spaced from the optical signal by the spacing frequency. The method also includes filtering a first slice of the optical signal and a second slice of the optical signal copy. The method also includes transmitting the first slice of the optical signal and the second slice of the optical signal through the first channel and the second channel, respectively. The method also includes stitching the first slice of the optical signal with the second slice of the optical signal copy to generate a stitched version of the original optical signal.

17 Claims, 14 Drawing Sheets

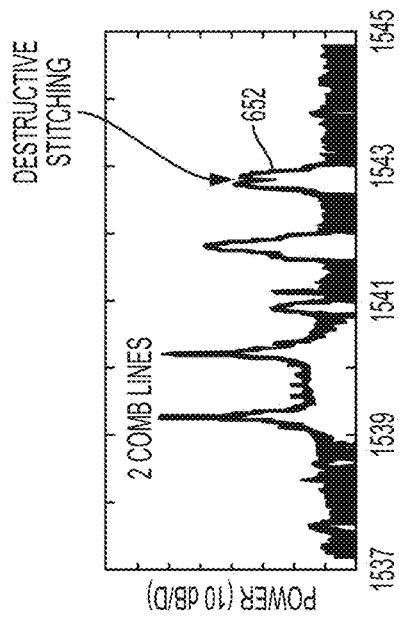
FIG. 6E
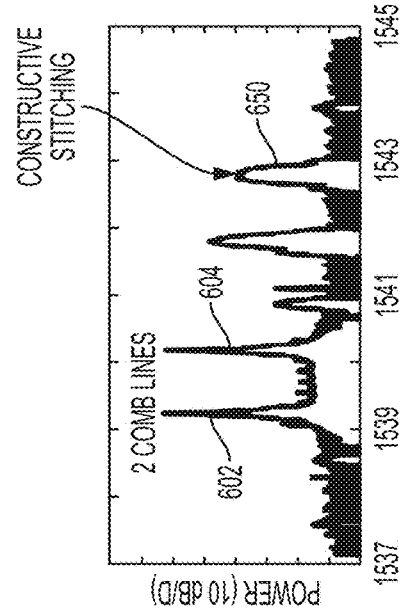
FIG. 6F
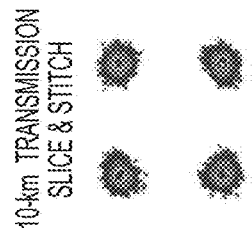
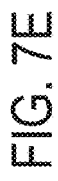
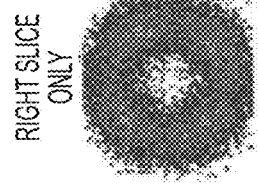
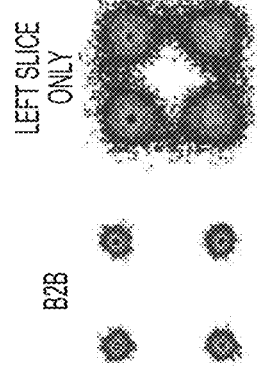
FIG. 7A  FIG. 7B  FIG. 7C  FIG. 7D  FIG. 7E

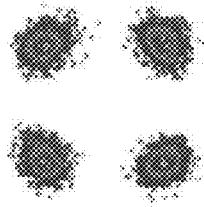
FIG. 16A SINGLE CHANNEL
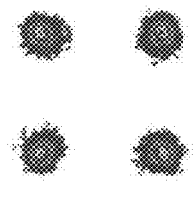
FIG. 16C SLOT-1 DIRECT INSERTION
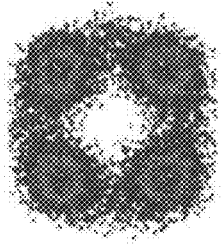
FIG. 16B SLICE & STITCH IN WDM CHANNELS
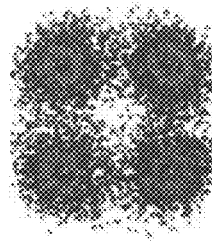
FIG. 16D SLOT-2 DIRECT INSERTION
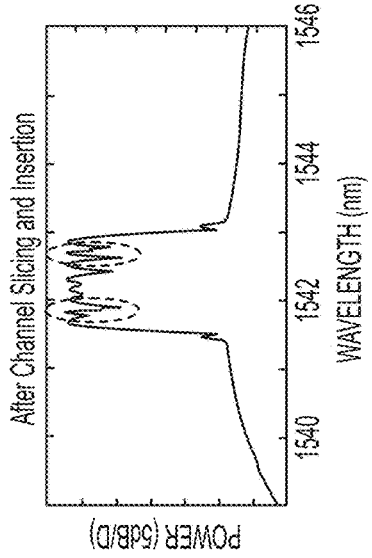
FIG. 15A
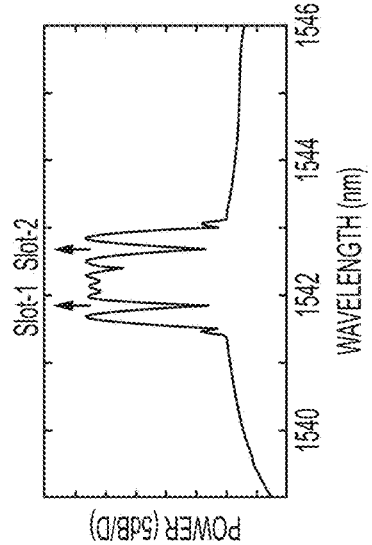
FIG. 15B
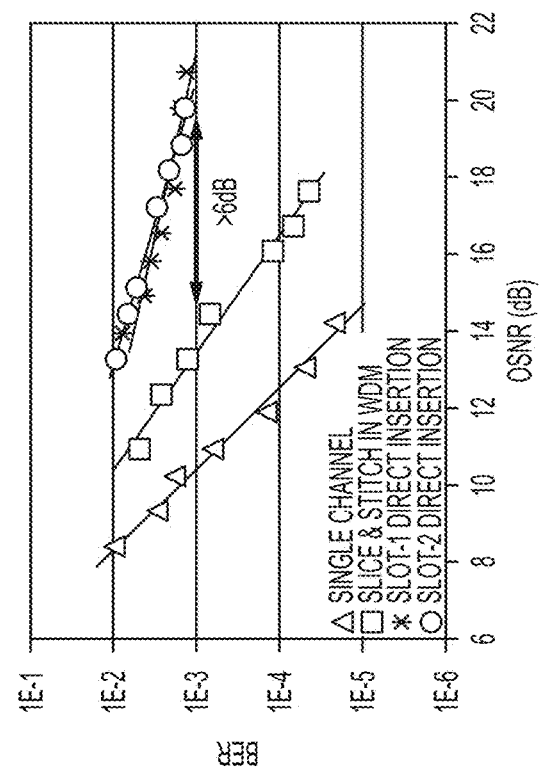
FIG. 17

TUNABLE OPTICAL CHANNEL SLICING AND STITCHING TO ENABLE DYNAMIC BANDWIDTH ALLOCATION

CROSS REFERENCE TO RELATED APPLICATIONS

This application claims the benefit and priority of U.S. Provisional Application No. 62/456,517, entitled "TUNABLE OPTICAL CHANNEL SLICING AND STITCHING TO ENABLE DYNAMIC BANDWIDTH ALLOCATION," filed on Feb. 8, 2017, the entire disclosure of which is hereby incorporated by reference herein in its entirety.

BACKGROUND

1. Field

The present disclosure is directed to systems and methods for slicing optical signals, inserting them into available slots in an optical spectrum, transmitting them via a transmitter, and stitching the signal together at the receiver.

2. Description of the Related Art

Optical transmission lines are becoming popular due to the relatively large bandwidth they provide. Many different signals may be simultaneously transmitted along an optical transmission line so long as an available slot has a sufficient bandwidth to accept the new signals. However, it may occasionally be desirable to transmit a signal on an optical transmission line that has a greater bandwidth than any single available slots on the optical transmission line. However, the total bandwidth of the available frequency slots may be larger than the new optical signal. Therefore, it is desirable to develop systems and methods for transmitting the new optical signal through discrete available transmission frequency slots.

SUMMARY

Described herein is a method for transmitting an optical signal through a first channel and a second channel that are separated by a spacing frequency. The method includes coupling the optical signal with a first pair of spacing coherent optical frequency comb lines separated by the spacing frequency to create an optical signal copy that is spaced from the optical signal by the spacing frequency. The method also includes filtering a first slice of the optical signal and a second slice of the optical signal copy, the first slice representing a first portion of the optical signal and the second slice representing a second complementary portion of the optical signal. The method also includes transmitting the first slice of the optical signal and the second slice of the optical signal copy through the first channel and the second channel, respectively. The method also includes stitching the first slice of the optical signal with the second slice of the optical signal copy to generate a stitched version of the original optical signal.

Also disclosed is a method for transmitting an optical signal. The method includes identifying, at a transmitter, at least two available channels in an available optical spectrum each having an available bandwidth. The method also includes receiving, at the transmitter, a request for a new optical signal having a signal bandwidth that is greater than the available bandwidth of either (or both) of the at least two available channels. The method also includes splitting, at the transmitter, the new optical signal into at least two signal slices each capable of fitting into the available bandwidth of one of the at least two available channels. The method also includes transmitting, by the transmitter, the at least two signal slices to a receiver. The method also includes receiving, by a receiver, the at least two signal slices. The method also includes stitching together, at the receiver, the at least two signal slices to generate a stitched version of the new optical signal.

Also disclosed is a system for transmitting an optical signal. The system includes a transmitter. The transmitter is designed to identify at least two available channels in an available optical spectrum each having an available bandwidth. The transmitter is also designed to receive a request for a new optical signal having a signal bandwidth that is greater than the available bandwidth of either of the at least two available channels. The transmitter is also designed to split the new optical signal into at least two signal slices each capable of fitting into the available bandwidth of one of the at least two available channels. The transmitter is also designed to transmit the at least two signal slices onto an optical transmission line. The system also includes a receiver. The receiver is designed to receive the at least two signal slices via the optical transmission line. The receiver is also designed to stitch together the at least two new channels to generate a stitched version of the new optical signal.

BRIEF DESCRIPTION OF THE DRAWINGS

FIGS. 6A-6F are graphs illustrating various stages of the optical signal throughout the system of FIG. 5 according to an embodiment of the present invention;

FIGS. 7A-7E are constellation comparisons of a 20 Gbaud QPSK channel under different scenarios according to an embodiment of the present invention;

FIGS. 15A and 15B illustrate measured spectrums before and after fragmented bandwidth allocation, respectively, according to an embodiment of the present invention;

FIGS. 16A-16D illustrate a constellation comparison between direct channel insertion and fragmented bandwidth allocation enabled by channel slicing and stitching according to an embodiment of the present invention; and FIG. 17 illustrates bit error rate comparison between direct channel insertion and fragmented bandwidth allocation enabled by slicing and stitching according to an embodiment of the present invention.

DETAILED DESCRIPTION

Figure 1:
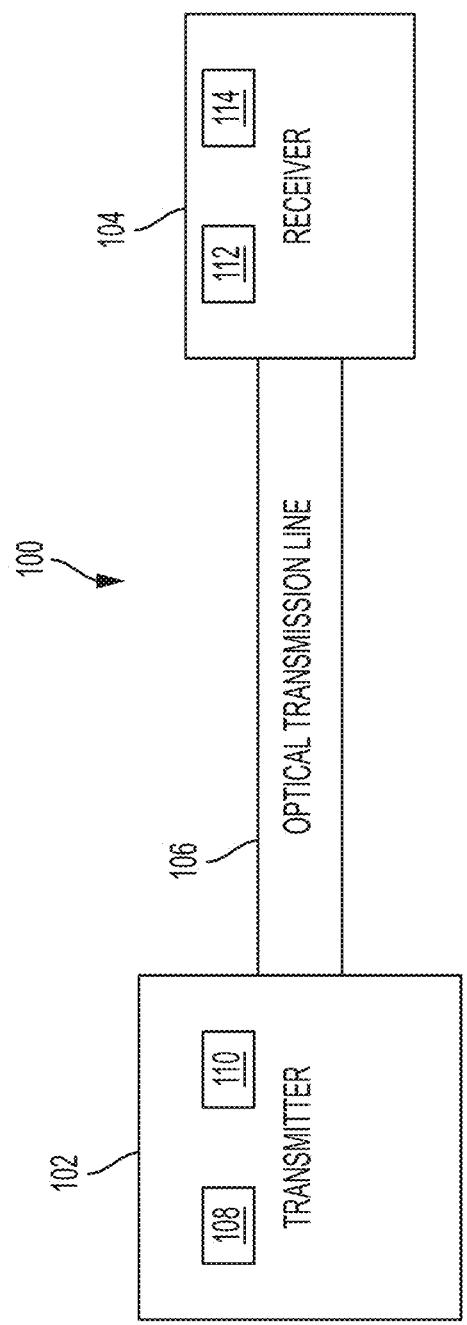
FIG. 1 illustrates a system for slicing and stitching an optical signal for transmission on an optical transmission line according to an embodiment of the present invention.

Referring to FIG. 1, a system 100 for transmitting optical signals is shown. The system 100 includes a transmitter 102, a receiver 104, and an optical transmission line 106. The transmitter 102 may be designed to optimize signal transfer on an optical spectrum within which the system 100 operates. For example and as will be described below, the transmitter 102 may split a new optical signal (having a signal bandwidth, such as a relatively large signal bandwidth) into two or more slices to fit the optical signal into available channels (each having a bandwidth less than the signal bandwidth). The transmitter 102 may include a processor 108 that handles signal processing and other logic functions, and a memory 110 that stores data usable by the processor 108.

The receiver 104 may receive the slices of the optical signal and may stitch the slices together to re-form the original new optical signal having the signal bandwidth. In this way, the system 100 increases efficiency of the optical signal transmission by allowing more optical signals to travel along the optical transmission line 106 simultaneously. The receiver 104 may include a processor 112 that handles signal processing and other logic functions, and a memory 114 that stores data usable by the processor 112.

Disclosed herein are systems and methods for fragmented bandwidth allocation enabled by channel slicing and stitching, as will be described below. Assuming that the current optical spectrum is occupied by multiple data channels with a few relatively small frequency slots available, an incoming optical signal or channel (S) may have a large bandwidth that cannot be accommodated by any single currently available frequency slot without introducing severe inter-channel interference (ICI) from spectrum overlapping. However, the total bandwidth of the separate available frequency slots may be larger than that of the new incoming channel S. In this case, the new incoming channel S can be sliced into two or more spectral fragments, which are then reallocated into the available frequency slots. The detail of this process is described below using a two-slice example. In the beginning, a coherent copy of channel S is generated at another wavelength by nonlinear wave mixing of channel S with a pair of optical frequency comb lines. After channel copy generation, an optical filter may be employed to slice partial spectra of the two channels. It is noted that the combination of the two output channel slices (S1 and S2) should preserve all the information of the original channel S. Then, S1 and S2 may be sufficiently narrow to be inserted into the two available frequency slots for transmission.

Figure 2:
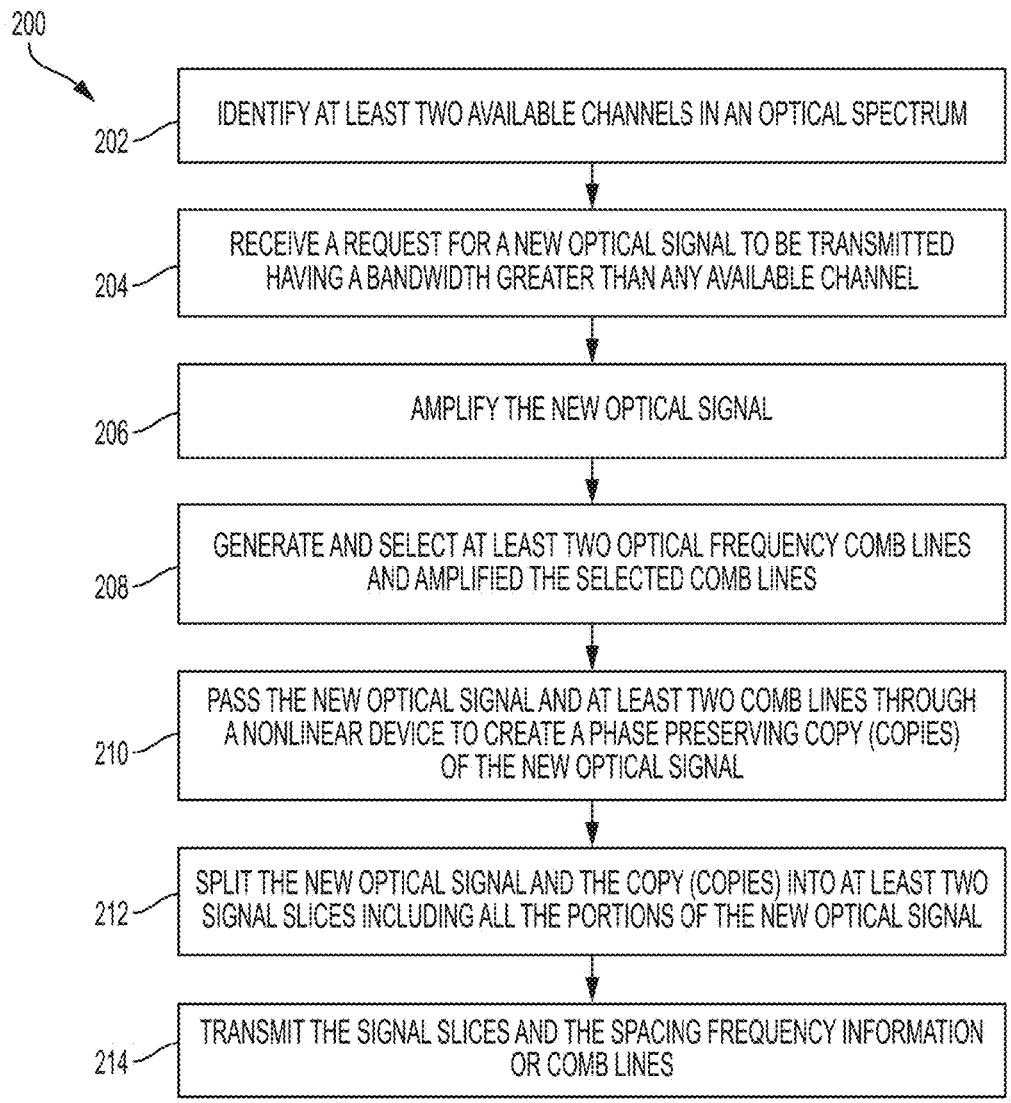
FIG. 2 is a flowchart illustrating a method for slicing an optical signal to fit the optical signal within available transmission slots according to an embodiment of the present invention.
Figure 3:
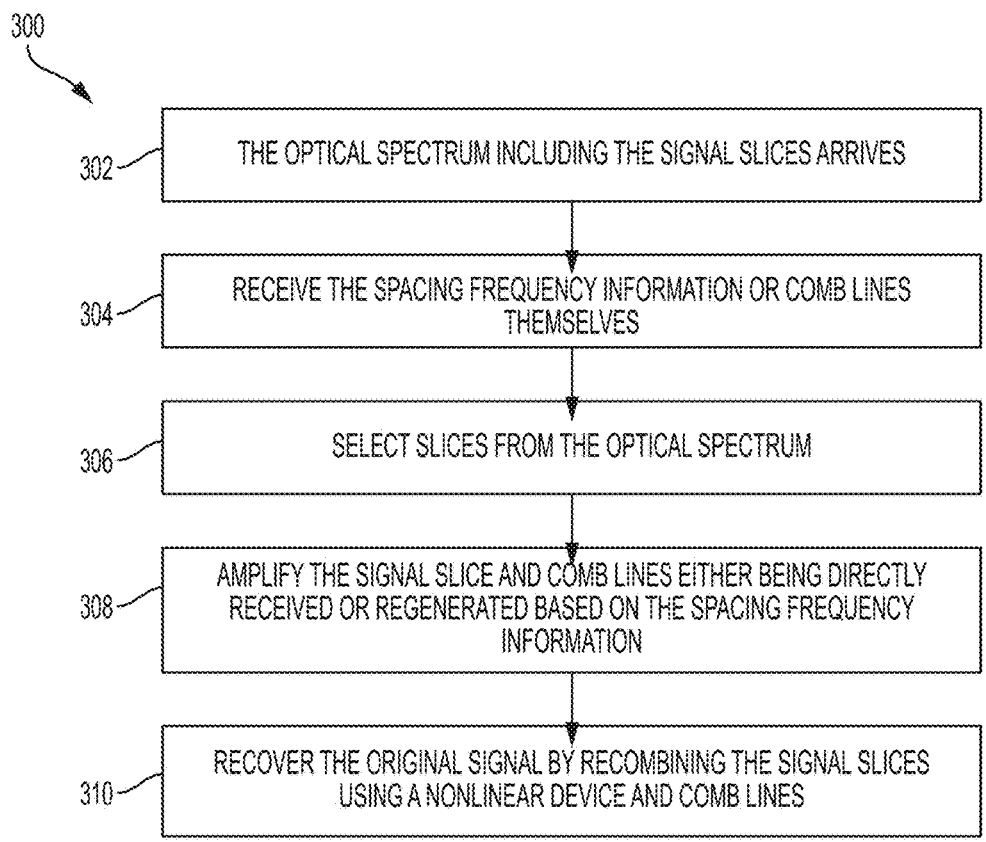
FIG. 3 is a flowchart illustrating a method for stitching optical signal slices at a receiver according to an embodiment of the present invention.

Referring to FIGS. 2 and 3, methods 200 and 300 for transmitting an optical signal through a multiple discrete channels and reconstructing the optical signal, respectively, are shown. The methods 200 and 300 may be performed by a system, such as the system 100 of FIG. 1.

Figure 4A:
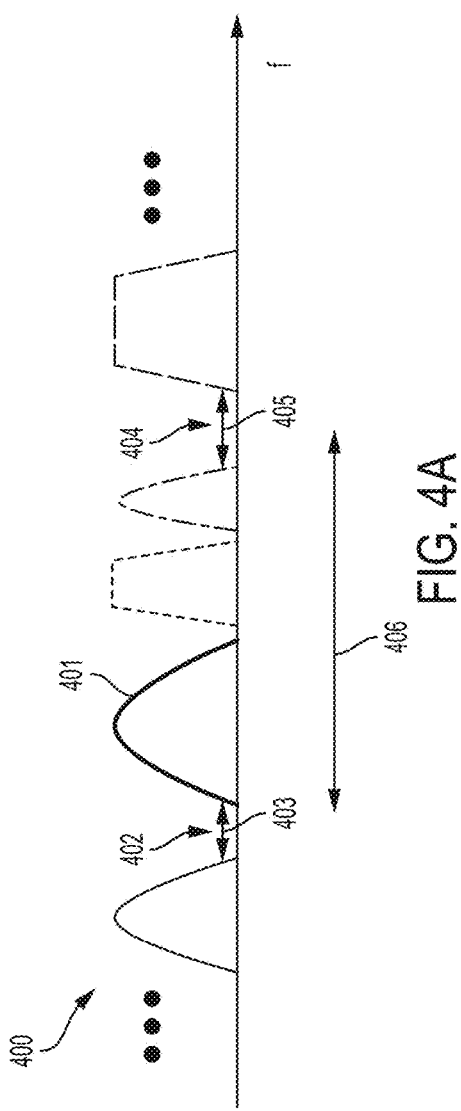
FIGS. 4A-4E are representations of an optical spectrum, a new optical signal to be transmitted along a transmission line, and slicing of the optical signal to fit within available slots of the optical spectrum according to an embodiment of the present invention.

In block 202, at least two available channels may be identified in an optical spectrum within which optical transmission may occur. For example and referring to FIG. 4A, signals on an optical spectrum 400 may be transmitted along a transmission line, such as the transmission line 106 of FIG. 1. The optical spectrum 400 may include existing signals 401 along with a first channel 402 having a first bandwidth 403 and a second channel 404 having a second bandwidth 405.

Figure 4B:
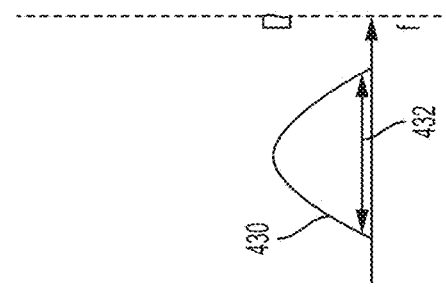

Returning reference to FIG. 2 and in block 204, a request may be received for a new optical signal to be transmitted on the transmission line. The new optical signal may have a bandwidth that is greater than any of the available channels. For example and referring to FIGS. 4A and 4B, a request may be received for a new optical channel 430 to be transmitted along with the existing signals 401. The new optical signal 430, however, has a signal bandwidth 432 that is greater than either of (or both of) the first bandwidth 403 and the second bandwidth 405.

Returning reference to FIG. 2 and in block 206, the new optical signal may be amplified. The new optical signal may be amplified using any existing amplification technique.

In block 208, at least two optical frequency comb lines may be generated. The optical frequency comb lines may be selected and amplified as well in this block.

In block 210, at least one coherent copy of the new optical signal may be created by passing the new optical signal and at least two optical frequency comb lines through a nonlinear device such as periodically poled lithium niobate (PPLN) waveguide to preserve the phase of the optical signal in the copy. The comb lines may be created that are separated by a frequency differential between the available channels in which the new optical signal will be transmitted.

Figure 4C:
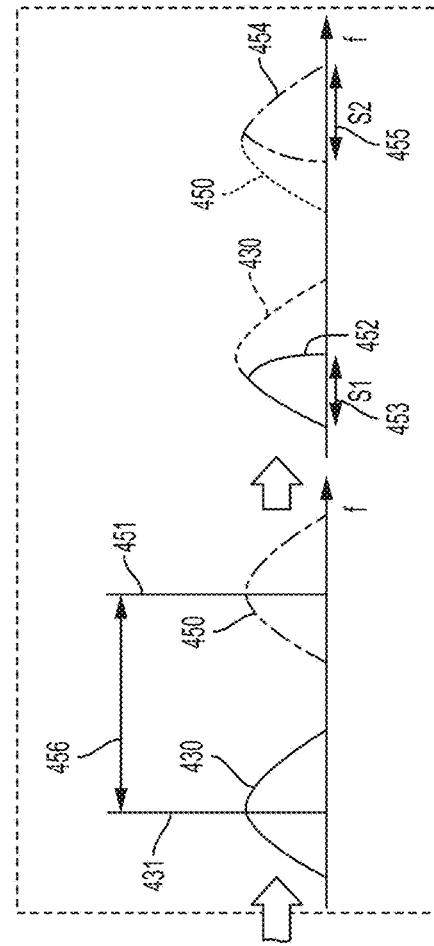

For example and referring to FIG. 4C, a copy 450 of the new optical signal 430 may be created by wave mixing the new optical signal with the two comb lines. The first comb line 431 and the second comb line 451 may be spaced apart by the spacing frequency 456, which enables the copy 450 of the new optical signal 430 being automatically spaced apart by a spacing frequency 456 that is equal to a frequency differential 406 between a first channel 402 and the second channel 404.

Returning reference to FIG. 2 and in block 212, the new optical signal and the copy (or copies) of the new optical signal may be split into at least two signal slices that each include different portions of the new optical signal. For example and again returning reference to FIGS. 4A and 4C, the new optical signal 430 may be sliced to form a first slice 452 that is capable of fitting in the first channel 402, and the copy 450 may be sliced to form a second slice 454 that fits within the second channel 404. A bandwidth 453 of the first slice may be selected to be equal to or less than the bandwidth 403 of the first channel 402. Likewise, a bandwidth 455 of the second slice 454 may be selected to be equal to or less than the bandwidth 405 of the second channel 404. In that regard, selection of the quantity and location of slicing of the new optical signal 430 may be performed based on the quantity of available channels in the optical spectrum and their corresponding frequencies.

Figure 4D:
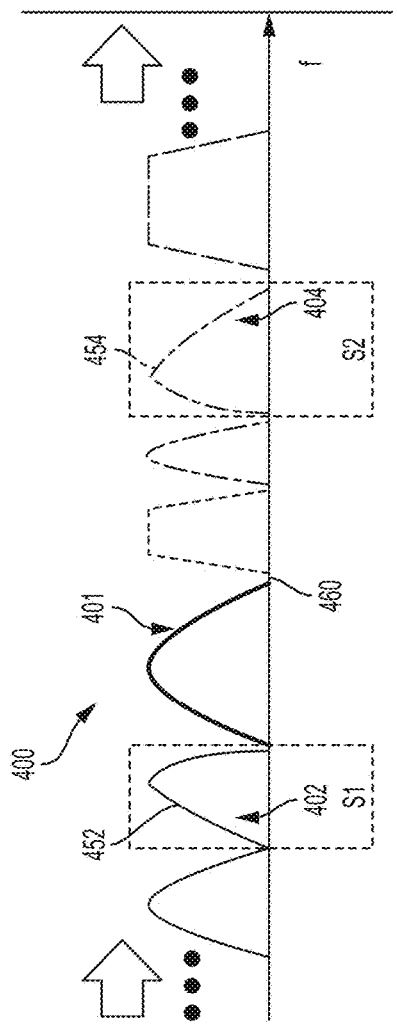

Returning reference to FIG. 2 and in block 214, the signal slices may be transmitted along the transmission line along with the existing signals. For example and referring to FIG. 4D, the existing channels 401 along with the first slice 452 and the second slice 454 are transmitted along a transmission line 460. The first slice 452 is inserted into the first slot 402 and the second slice 454 is inserted into the second slot 404.

To reconstruct the original new optical signal S at the receiver, the two channel slices S1 and S2 may be first selected from the current wavelength-division-multiplexing (WDM) system. Then, another stage of comb-based wavelength conversion may be employed to recombine S1 and S2 in phase for channel recovery. Because of non-ideal filtering in both stages of spectrum filtering and slice selection, S1 and S2 may have a partially overlapped spectrum, which can then produce inter-symbol interference (ISI). However, the effect of ISI can be readily compensated by a digital linear equalizer afterwards and the original new optical signal S can ultimately be recovered. Note that this channel slicing and stitching technique is scalable to more than two slices simply by generating more copies of the original data channel and by following the methods 200, 300 shown in FIGS. 2 and 3.

Turning now to FIG. 3, the signals from the optical spectrum may arrive at the receiver in block 302. The signals may include the signal slices that correspond to the original optical signal.

Figure 4E:
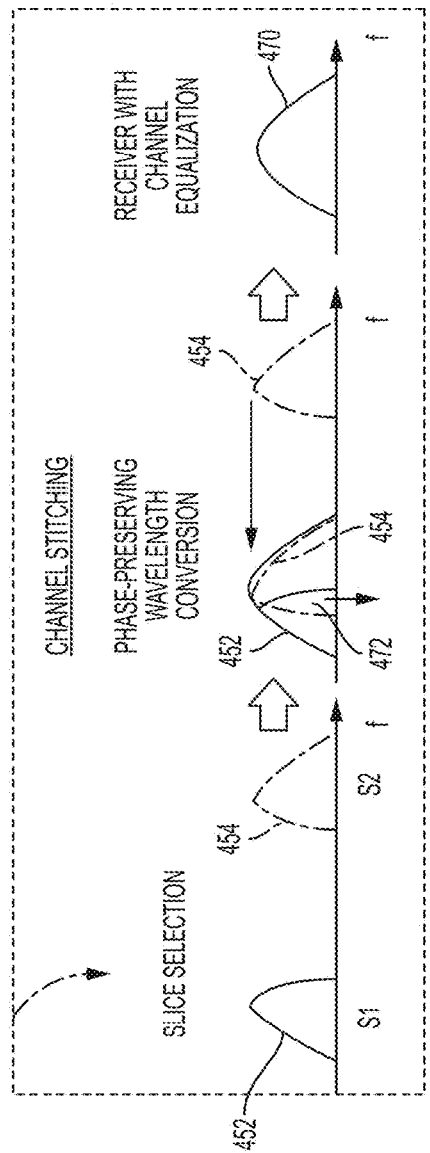

In block 304, the comb lines may be received at the receiver, or generated at the receiver based on the spacing frequency (for example, the receiver may receive or otherwise become aware of the spacing frequency). In block 306, the slices may be selected from the optical spectrum. For example, the slices may be selected from the WDM system such as, for example, via filtering. Referring briefly to FIG. 4E, the slices 452, 454 may be separated or removed from the optical transmission line.

Returning reference to FIG. 3 and in block 308, the signal slices may be amplified using any amplifier known in the art. Meanwhile, the comb lines may also be amplified. In block 310, the signal slices may be stitched together based on the spacing frequency and using the original or new comb lines. In some embodiments, the signal slices may be stitched together using techniques other than comb lines.

Referring again to FIG. 4E, some overlap 472 may exist between the signal slices 452, 454. However, after at least one of equalization or another filtering technique, a stitched version 470 of the original optical signal may have relatively little noise and may be used as the original signal.

Figure 5:
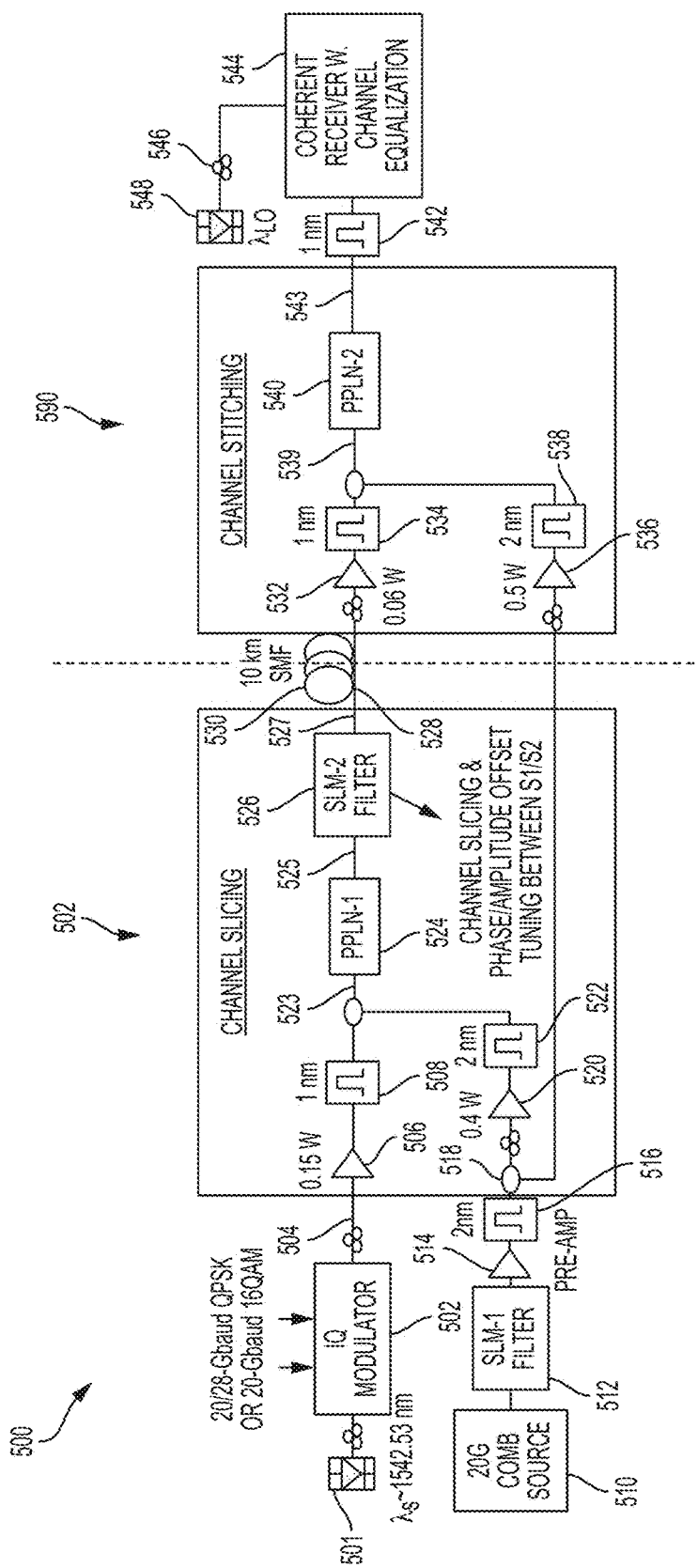
FIG. 5 is a system illustrating a method for transmitting an optical signal through a first channel and a second channel that are separated by a spacing frequency according to an embodiment of the present invention.

As described above, a key function to achieving fragmented bandwidth allocation is channel slicing and stitching. FIG. 5 below illustrates a single-channel experimental setup used to demonstrate operation of such slicing and stitching. After discussion of the exemplary system 500, results of experiments using the system 500 will be provided.

The system 500 may include a transmitter 502 and a receiver 590. The transmitter 502 may include a laser 501 and a quadrature signal (IQ) modulator 502. The IQ modulator 502 may be, for example, a 20/28 Gigabaud (Gbaud) quadrature phase shift keying (QPSK) modulator, a 20 Gbaud quadrature amplitude modulation (QAM) modulator, or the like. The laser 501 may generate a light source which may pass through the IQ modulator 502, which may output a new optical signal 504 (corresponding to the signal (S)). In some embodiments, the new optical signal 504 may have a wavelength of 1542.53 nanometers (nm) and may have a pulse or other shape.

The new optical signal 504 may pass through an amplifier 506, which may have a power of 0.15 W. The new optical signal 504 may then pass through a 1 nm filter 508.

Simultaneously, a comb source 510 having a 20 GHz repetition rate may be generated by a motor locked laser (MLL). A spatial light modulator (SLM) filter 512 may be used to select two comb lines. For example, the comb lines may have wavelengths of 1538.9 nm and 1539.86 nm. The difference in wavelength between the 2 comb lines may correspond to the wavelengths shift of the copy of the new optical signal 504. The two comb lines may then pass through a preamplifier 514 and a 2 nm filter 516, which may output the 2 pre-amplified comb lines 518. The comb lines 518 may then pass through an amplifier 520 that has a power of 0.4 W and may then pass through another 2 nm filter 522. A copy of the 2 comb lines 518 may also be transmitted to the receiver 590.

After amplification, the combination of the new optical signal 504 and the selected amplified comb lines 522 may be injected into a PPLN waveguide 524 having a quasi-phase matching (QPM) wavelength of 1541 nm. A copy of the new optical signal 504 may be output by the PPLN waveguide 524. The copy of the new optical signal may have less power (such as 10 decibels (dB) less power) due to the conversion efficiency.

The new optical signal 504 and the copy may be passed through another SLM filter 526 to cut a left slice from the original optical signal 504 and a right slice from the copy of the signal. The slices of the optical signal 504 and the copy are then transmitted to the receiver 590 via an optical channel 528. The bandwidths of the optical channel used in the experiments were 27 GHz and 18 GHz. The optical channel 528 used in the experiment was a 10 kilometer (km) long single mode fiber (SMF) channel. In some experiments, the slices were sent directly to channel stitching for reconstruction for comparison with the slices that were transmitted along the optical channel 528.

At the receiver 590, the slices are received by an amplifier 532 and amplified. The amplifier 532 may be a 0.06 W amplifier. The slices may then be passed through a 1 nm filter 534 before being rejoined with the comb lines. The comb lines may pass through a 0.5 watt amplifier 536 and a 2 nm filter 538 prior to combination with the slices.

After the slices and comb lines have been rejoined, they pass through a second PPLN waveguide 540 having the same QPM wavelength as the first PPLN waveguide 524. The first slice is shifted to the right with a conversion efficiency of negative 10 dB and recombined with the second slice. Because the second slice was originally about 10 dB below the first slice, the first slice and the second slice may have similar power amplitudes during recombination. Due to nonideal filtering, the two slices may have approximately a 5 GHz partial spectrum overlap. As a result of the overlap, tuning of the phase offset ($\Delta\varphi$) between S1 and S2 in SLM-2 can lead to constructive ($\Delta\varphi=0$) or destructive ($\Delta\varphi=180$ degrees) channel stitching.

After passing through the PPLN waveguide 540, the stitched signal may pass through a 1 nm filter 542 before being received by a coherent receiver with channel equalization 544. Based on a conventional decision-directed algorithm, digital channel equalization with 11 taps was used to remove spectrum-overlapping-induced ISI. If the amount of spectrum overlap increases, more taps might be required to compensate for the increased ISI.

The receiver 544 is a coherent optical receiver which requires a local laser 548 to beat the incoming signal after 542 with the same polarization by tuning the polarization controller 546.

Figure 6B:
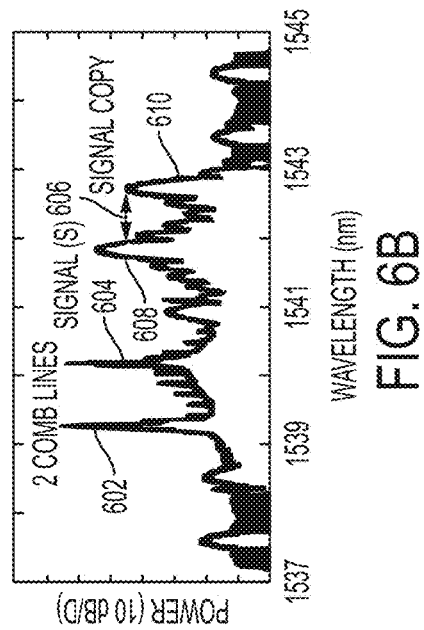
Figure 6D:
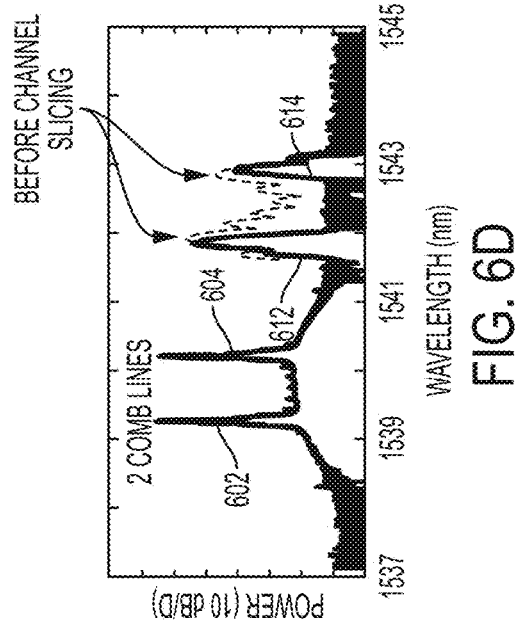
Figure 6A:
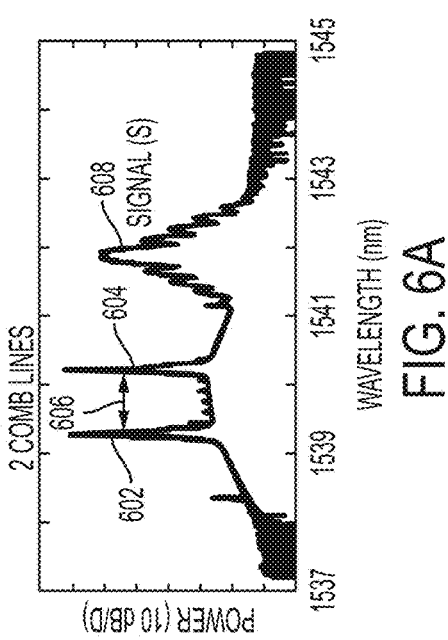

Referring to FIGS. 5 and 6A, the combination of the new optical signal 608 and the comb lines 602, 604 at a location 523 is shown. As shown, the comb lines 602, 604 are separated by the spacing frequency 606.

Referring to FIGS. 5 and 6B, the output of the PPLN waveguide 524 as shown at a location 525. As shown, the PPLN waveguide 524 outputs the 2 comb lines 602, 604 along with the new optical signal 608 and the copy of the optical signal 610. The new optical signal 608 and the copy of the optical signal 610 are separated by the spacing frequency 606. Furthermore, the copy of the optical signal 610 is approximately 10 dB less in power than the new optical signal 608.

Figure 6C:
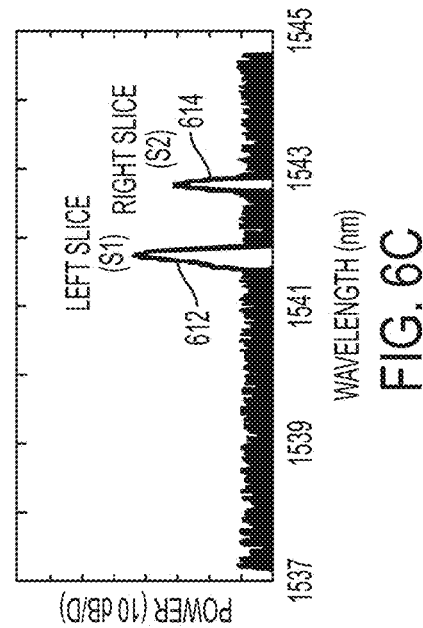

Referring to FIGS. 5 and 6C, the output of the SLM filter 526 is shown at a location 527. As shown, the SLM filter 526 outputs the left slice 612 and the right slice 614.

Referring to FIGS. 5 and 6D, the signal that includes the slices 612, 614 and the comb lines 602, 604 at a location 539 is shown. The comb lines 602, 604 are used to move the left slice 612 over to the right slice 614.

Referring to FIGS. 5 and 6E, the slices have been stitched together to create a stitched version of the new optical signal 650. The signal shown in FIG. 6E is detected at a location 543. The stitching performed as illustrated in FIG. 6E is constructive stitching.

Referring to FIGS. 5 and 6F, the slices have been destructively stitched together to create a stitched version of the new optical signal 652. The signal shown in FIG. 6F is detected at the location 543. Referring to FIGS. 6E and 6F, the stitched signal 650 using constructive stitching may be preferable to the stitched signal 652 using destructive stitching.

It is to be noted that in FIG. 6A, the input optical signal includes both the fundamental band and side lobes. The peak power difference between them may be greater than 15 dB, and no significant contribution of the side lobes to the signal quality is observed. Therefore, the output signal may be allowed to primarily be composed of the fundamental band component, and the channel bandwidth may be considered to be the frequency range of the fundamental band component. Moreover, in order to use channel slicing and stitching for the given WDM grid: (i) the bandwidth of the input signal should be greater than the spectral grid spacing; and (ii) the bandwidths of the sliced signals should be less than the spectral grid spacing.

Referring to FIGS. 7A through 7D, constellation diagrams of a 20 Gbaud QPSK channel with 30 dB OSNR under different scenarios are shown. In particular, FIG. 7A illustrates a back-to-back (B2B) baseline without channel slicing and stitching. FIG. 7B illustrates detection of only the left channel slice. FIG. 7C illustrates detection of only the right channel slice. FIG. 7D illustrates back-to-back (B2B) (i.e., no transmission line) with channel slicing and stitching. FIG. 7E illustrates the stitched signal after a 10 km transmission with channel slicing and stitching.

Compared to a B2B baseline shown in FIG. 7A, FIGS. 7B and 7C indicate that the channel quality may deteriorate if only a partial spectrum is detected. The different constellations between the left and right slices may be the result of unequal bandwidths of the two slices. FIG. 7D illustrates that the channel may be successfully recovered after channel stitching of the left and right slices. The signal quality is almost preserved after the 10 km transmission, as shown in FIG. 7E, because the channel equalization at the receiver also compensates for chromatic dispersion.

Referring again to FIG. 5, the system performance is further evaluated by tuning the relative phase offset ($\Delta\varphi$) and relative amplitude ($\Delta\alpha$) between the left slice and the right slice in the SLM filter 526. The reason to investigate the impact of phase/amplitude imbalance is because the two parameters could affect the performance of channel stitching.

Figure 8A:
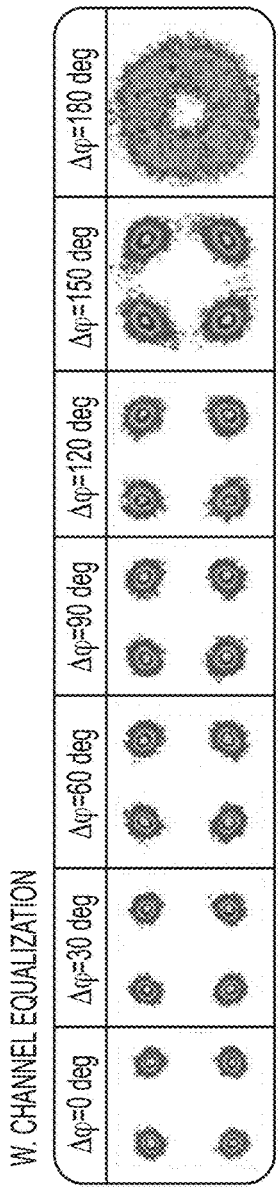
FIGS. 8A-8C are constellation comparisons of a 20 Gbaud QPSK channel under different phase offsets according to an embodiment of the present invention.
Figure 8B:
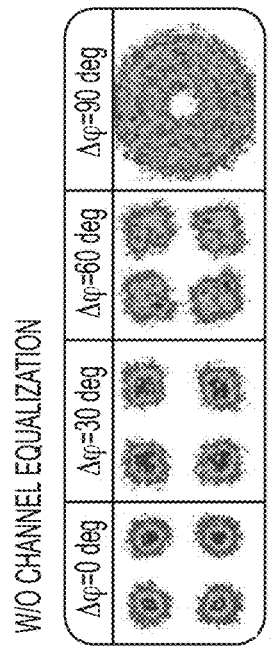
Figure 8C:
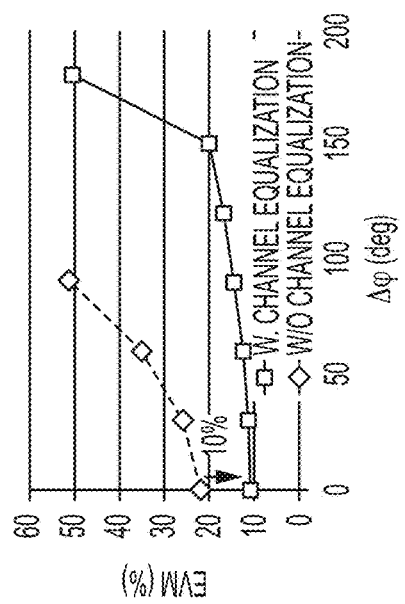

FIGS. 8A-8C illustrate various features of the stitched signal for a 20 Gbaud QPSK signal by tuning the relative phase offset between two channel slices. FIG. 8A illustrates constellation diagrams of the stitched signal with channel equalization for various phase differentials. FIG. 8B illustrates constellation diagrams of the stitched signal without channel equalization for various phase differentials. FIG. 8C illustrates measured error-vector-magnitude (EVM) with different phase differentials.

As shown in FIGS. 8A through 8C, when the phase is aligned ($\Delta\varphi=0$), channel equalization can compensate for the ISI effect due to the partial spectrum overlapping of the left and right channel slices. Channel equalization helps to decrease the EVM from approximately 20% down to approximately 10%, as shown in FIG. 8C. Additionally, the tolerance of $\Delta\varphi$ can be as large as 150 degrees with channel equalization, whereas the system without channel equalization may fail if $\Delta\varphi$ is 90 degrees.

Figure 9A:
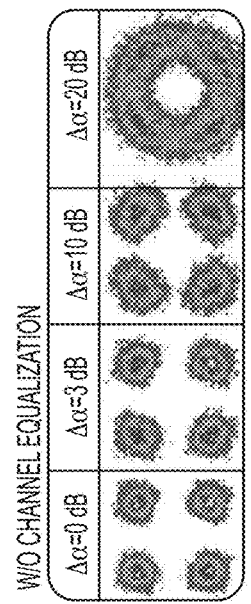
FIGS. 9A-9C are constellation comparisons of a 20 Gbaud QPSK channel under different amplitude offsets according to an embodiment of the present invention.
Figure 9B:
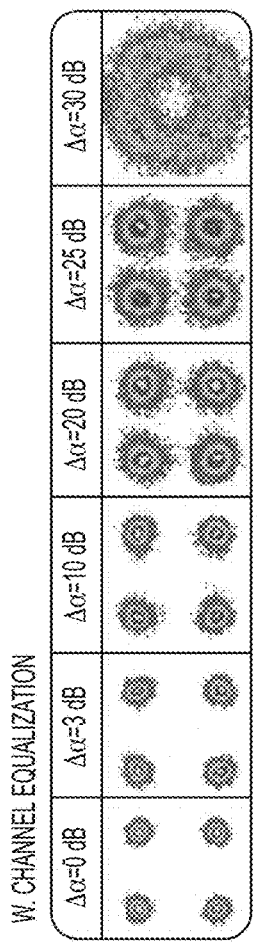
Figure 9C:
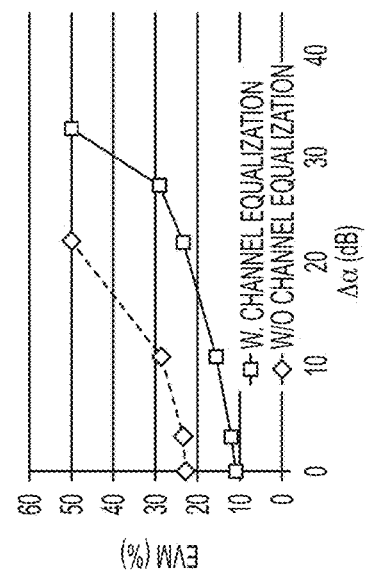

FIGS. 9A-9C illustrate various features of the stitched signal for a 20 Gbaud QPSK signal by tuning the relative amplitude between two channel slices. FIG. 8A illustrates constellation diagrams of the stitched signal with channel equalization for various amplitude differentials. FIG. 8B illustrates constellation diagrams of the stitched signal without channel equalization for various amplitude differentials. FIG. 8C illustrates measured error-vector-magnitude (EVM) with different amplitude differentials.

In terms of the relative amplitude $\Delta\alpha$, the system with channel equalization may still be operable when $\Delta\alpha$ is 25 dB, whereas an equalization-free system may be incapable of tolerating $\Delta\alpha$ of 20 dB. As a result, digital channel equalization not only enhances the performance of channel stitching by compensating for ISI, but it also increases the system tolerance for phase/amplitude imbalance. Additionally, a lower signal EVM can be obtained if the phase/amplitude imbalance is pre-compensated optically by SLM-2, as shown in FIGS. 8A and 8C, and FIGS. 9A and 9C. Therefore, (i) channel equalization is included primarily to compensate for ISI; and (ii) the phase/amplitude imbalance is pre-compensated in the optical domain.

Figure 10A:
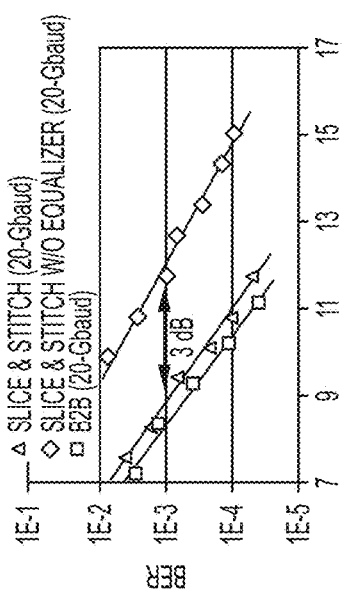
FIGS. 10A and 10B are bit error rate comparisons for a 20 Gbaud QPSK system with and without equalization, and back-to-back and over a transmission line according to an embodiment of the present invention.
Figure 10B:
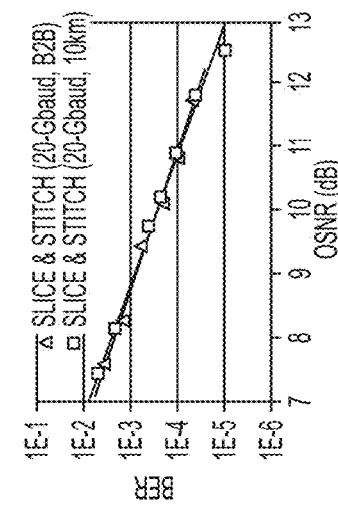

FIG. 10A is a graph illustrating bit error rate (BER) comparison for a 20 Gbaud QPSK system with and without digital equalization, and FIG. 10B is a graph illustrating BER for B2B transmission and transmission over the 10 km transmission line.

Compared to a B2B baseline system, the optical signal-to-noise ratio (OSNR) penalty of channel slicing and stitching with channel equalization is below 1 dB, as shown in FIG. 10A. It is noted that for the B2B baseline system, the same channel equalization is used for comparison. In addition, the two nearly overlapping BER curves in FIG. 10B indicate the system penalty for the 10 km transmission is negligible. For longer-distance transmission, the increased chromatic dispersion, as well as the wavelength-dependent polarization rotation caused by higher order polarization mode dispersion (PMD), could affect the phase alignment among different channel slices. As a result, the performance of channel stitching might be degraded, which may require further investigation.

Figure 11A:
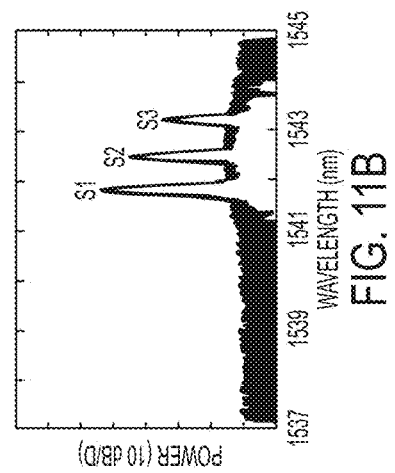
FIGS. 11A-11D illustrate channel slicing and stitching with three slices for a 28 Gbaud QPSK system according to an embodiment of the present invention.
Figure 11B:
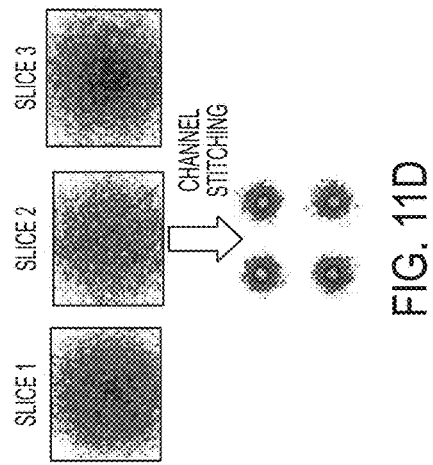
Figure 11C:
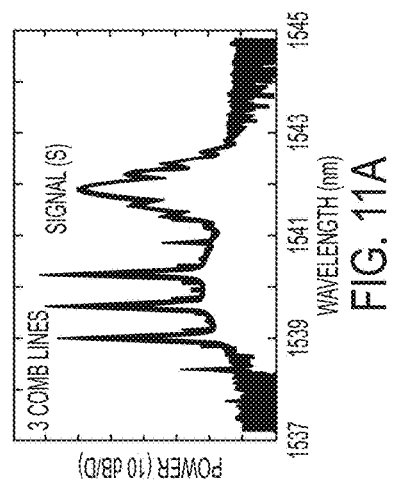
Figure 11D:
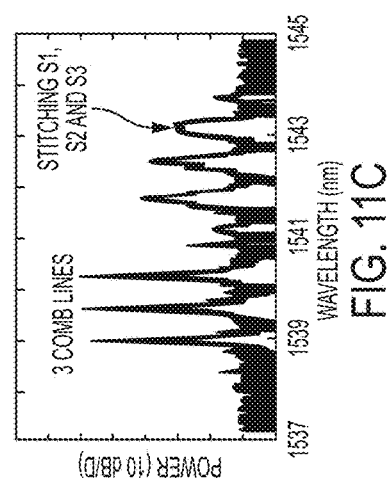

FIGS. 11A-11D illustrate channel slicing and stitching with 3 channel slices of a 28 Gbaud QPSK channel. FIG. 11A illustrates the optical spectrum before PPLN waveguide insertion. FIG. 11B illustrates the optical spectrum after the SLM 2 filter. FIG. 11C illustrates the optical spectrum after the second PPLN waveguide. FIG. 11D illustrates channel reconstruction by stitching the three channel slices.

The spectra of the channel slicing and stitching with three channel slices of a 28 Gbaud QPSK channel are shown in FIGS. 11A-11C, while the corresponding separate channel slices and reconstructed channel constellations are shown in FIG. 11D. Thus, FIGS. 11A-11D illustrate that slicing and stitching to fit new optical signals into optical transmission lines operates well for more than two slices.

Figure 12:
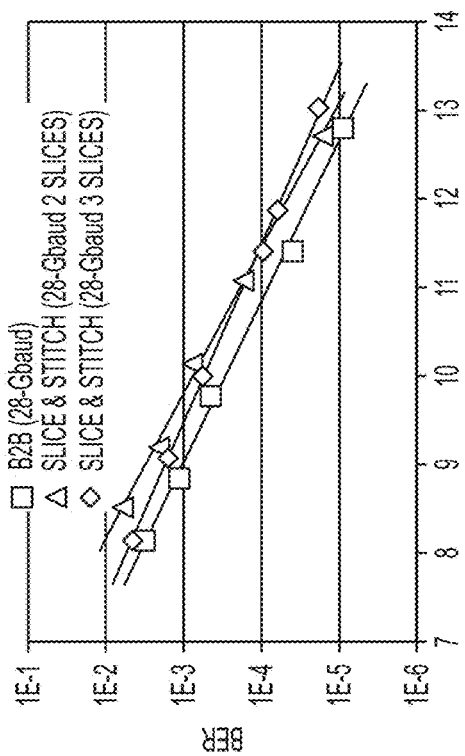
FIG. 12 illustrates a bit error rate comparison with various quantities of channel slices according to an embodiment of the present invention.

FIG. 12 illustrates BER curves of the 28 Gbaud QPSK system with two and three channel slices. It can be seen that the system performance does not strongly depend on the number of channel slices, and less than 1 dB OSNR penalty is observed compared to the B2B baseline.

Figure 13A:
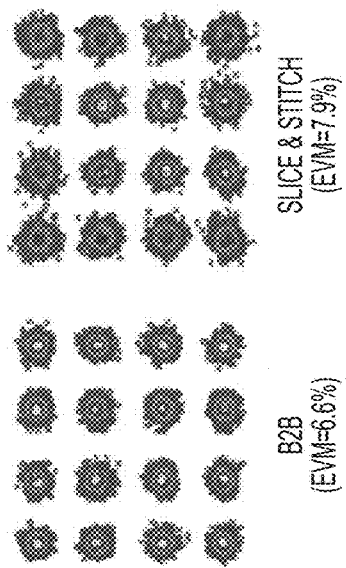
FIGS. 13A and 13B illustrate EVM comparison between back to back and channel slicing and stitching for a 20 Gbaud 16-QAM signal, and a bit error rate comparison according to an embodiment of the present invention.
Figure 13B:
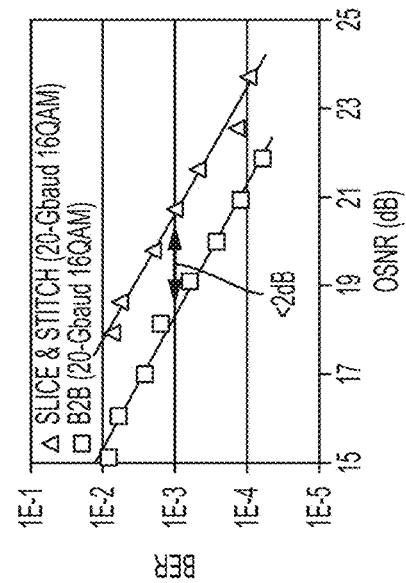

FIG. 13A illustrates EVM comparison between B2B and channel slicing and stitching for a 20 Gbaud 16QAM signal, and FIG. 13B illustrates BER comparison of the two. FIGS. 13A and 13B illustrate that the above-disclosed scheme may be extended to a 20 Gbaud 16QAM signal. Less than 1.5% EVM deterioration with 30 dB OSNR is observed, as shown in FIG. 13A. Compared to the QPSK scenario in FIG. 13A, a larger OSNR penalty is observed for 16QAM in FIG. 13B. A possible reason could be that high order QAM signals are more sensitive to any distortion introduced by nonlinear-wave-mixing-based wavelength conversion.

Figure 14:
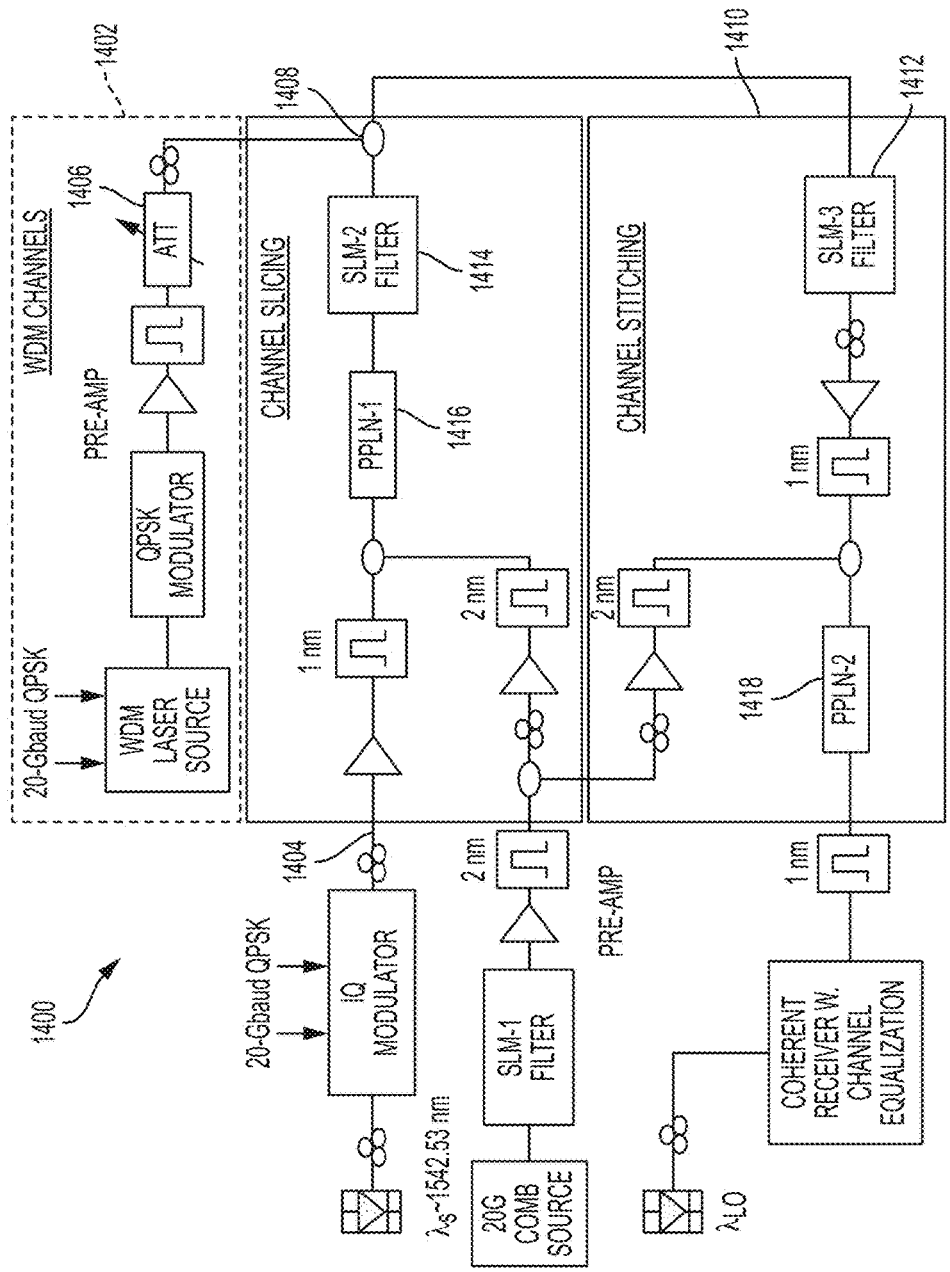
FIG. 14 illustrates a system for fragmented bandwidth allocation in 6 WDM channels each channel with 20 Gbaud according to an embodiment of the present invention.

The application of channel slicing and stitching to enable fragmented bandwidth allocation is experimentally demonstrated in a WDM system with 6 QPSK channels of 20 Gbaud. FIG. 14 illustrates an exemplary system 1400 for channel slicing and stitching in a WDM environment. The central wavelengths of the 6 channels are 1541.68, 1542.00, 1542.16, 1542.32, 1542.52, and 1542.87 nm. Compared to the single-channel experiment shown above, a stage of WDM channel generation is added, as shown by the dotted box 1402. In this case, an attenuator 1406 is used to adjust the power of the WDM channels, in order to make it similar to that of the added optical channel S 1404.

After the attenuator, a polarization controller 1408 is used to align the polarization of the WDM channels with that of channel S 1404 in order to maximize the ICI effect. The optical spectra before and after fragmented bandwidth allocation are shown in FIGS. 15A and 15B, in which the two sliced channels each have approximately 22 GHz optical bandwidth. At the receiver 1410, an extra SLM filter (SLM-3) 1412 is used for channel-slice selection and amplitude/phase adjustment. In order to allocate the same power into the two frequency slots, the channel slice with higher power is attenuated by 10 dB in SLM-2 1414 to offset the effect of the −10 dB conversion efficiency in PPLN-1 1416. Subsequently, the power difference is adjusted in SLM-3 1412 before channel stitching in PPLN-2 1418.

The constellation comparison is shown in FIGS. 16A-16D. Compared to direct channel insertion shown in FIGS. 16C and 16D, where the entire channel S is inserted into either Slot-1 or Slot-2, fragmented bandwidth allocation can effectively avoid channel spectrum overlapping and therefore suffer much less ICI penalty. The reason for signal quality deterioration in FIG. 16B compared to the single-channel scenario in FIG. 16A might be attributed to non-ideal filtering for selecting channel slices, which includes the residual spectra from adjacent channels.

For further system evaluation, BER measurements of the added channel S are presented in FIG. 17. Compared to direct channel insertion, fragmented bandwidth allocation has more than 6 dB OSNR improvement at a BER of 1e-3. There is an additional OSNR penalty of channel slicing and stitching compared to the single-channel scenario. Similarly, a possible reason for this penalty could be that the filter for selecting a desired channel slice is not significantly sharp to reject the adjacent channels.

This disclosure experimentally demonstrates a reconfigurable channel slicing and stitching for an optical signal to enable fragmented bandwidth allocation without O-E-O conversion. In a 6-channel WDM system, a 20 Gbaud optical channel is successfully reallocated into two fragmented frequency slots and reconstructed at the receiver. Although this scheme is demonstrated for an optical channel that is not pulse shaped, it is believed that the scheme is also applicable to channels that are pulse shaped, e.g., Nyquist shaping.

In the experiments, various issues may degrade system performance, including: (i) the power of the optical signal is attenuated by the loss of different equipment, such as the PPLN (~5 dB insertion loss) and the SLM filter (~6 dB insertion loss); (ii) nonlinear wave mixing in both stages of the channel slicing and stitching requires sufficient signal power as provided by a 2 W EDFA with a ~6 dB noise figure; and (iii) there are optical components with limited bandwidth. It is noted that there are other approaches that may reduce channel bandwidth to fit into the smaller frequency slot, such as narrow filtering or higher-order QAM signal conversion. They may not suffer the same degradations as the present disclosure, but may introduce other issues.

The reason for using an optical frequency comb instead of independent continuous wave lasers is to ensure phase locking among different channel slices, which is generally required for successful signal recovery at the receiver. In the experiments, the selected comb lines (within a ~10-nm spectrum range) have a similar OSNR of ~30 dB. As the scheme is scaled to more channel slices with larger frequency spacing, the quality of the stitched signal may be affected by different OSNRs of different comb lines. In addition, the same comb source was used for both channel slicing and stitching for ease of experimentation; a more realistic implementation would likely use two independent comb sources, one for the transmitter and one the receiver.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents. Where used throughout the disclosure and claims, "at least one of A or B" includes "A" only, "B" only, or "A and B."

What is claimed is:

1. A method for transmitting an optical signal through a first channel to take a first portion of the optical signal and a second channel to take a second portion of the optical signal, the first channel and the second channel being separated by a spacing frequency, the method comprising:
   generating multiple comb lines from a comb source;

selecting, using a filter, a first pair of spacing coherent optical frequency comb lines from the multiple comb lines;

nonlinearly mixing the optical signal with the first pair of spacing coherent optical frequency comb lines separated by the spacing frequency to create an optical signal copy that is spaced from the optical signal by the spacing frequency;

filtering a first slice of the optical signal and a second slice of the optical signal copy, the first slice representing a first portion of the optical signal and the second slice representing a second complementary portion of the optical signal;

transmitting the first slice of the optical signal and the second slice of the optical signal through the first channel and the second channel, respectively; and using nonlinear mixing to combine the first slice of the optical signal with the second slice of the optical signal copy with a second pair of spacing coherent optical frequency comb lines separated by the spacing frequency to recover the optical signal.

2. The method of claim 1 further comprising amplifying the optical signal prior to nonlinearly mixing the optical signal with the first pair of spacing coherent optical frequency comb lines.

3. The method of claim 1 wherein the filter includes a first spatial light modulator.

4. The method of claim 1 wherein nonlinearly mixing the optical signal with the first pair of spacing coherent optical frequency comb lines to create the optical signal copy includes passing the optical signal and the first pair of spacing coherent optical frequency comb lines through a first periodically poled lithium niobate waveguide having a quasi-phase matching wavelength such that a phase of the optical signal is preserved in the optical signal copy.

5. The method of claim 1 wherein filtering the first slice of the optical signal and the second slice of the optical signal copy includes tuning a phase offset between the first slice of the optical signal and the second slice of the optical signal copy based on a desire for the first slice and the second slice to be constructively combined.

6. The method of claim 1 further comprising inserting the first slice of the optical signal and the second slice of the optical signal copy to multiple signal channels for co-transmission prior to using the nonlinear mixing to combine the first slice of the optical signal with the second slice of the optical signal copy.

7. The method of claim 1 wherein using the nonlinear mixing to combine the first slice of the optical signal with the second slice of the optical signal copy includes amplifying the first slice of the optical signal with the second slice of the optical signal copy together with the first pair of spacing coherent optical frequency comb lines.

8. The method of claim 1 wherein using the nonlinear mixing to combine the first slice of the optical signal with the second slice of the optical signal copy further includes passing the separate two slices and the second pair of spacing coherent optical frequency comb lines through a second periodically poled lithium niobate waveguide having a quasi-phase matching wavelength.

9. The method of claim 1 further comprising transmitting the first slice of the optical signal through the first channel and transmitting the second slice of the optical signal copy through the second channel prior to using the nonlinear mixing to combine the first slice of the optical signal with the second slice of the optical signal copy.

10. A method for transmitting a first portion of an optical signal and a second portion of the optical signal through a first channel and a second channel, respectively, the method comprising:

generating multiple comb lines using a comb source;

selecting, using a filter, a first pair of spacing coherent optical frequency comb lines from the multiple comb lines;

identifying, at a transmitter, at least two available channels in an available optical spectrum each having an available bandwidth;

receiving, at the transmitter, a request for a new optical signal having a signal bandwidth that is greater than the available bandwidth of either of the at least two available channels;

nonlinearly mixing the new optical signal with the first pair of spacing coherent optical frequency comb lines separated by the spacing frequency to create an optical signal copy that is spaced from the new optical signal by the spacing frequency;

filtering a first slice of the new optical signal and a second slice of the optical signal copy, the first slice representing a first portion of the new optical signal and the second slice representing a second complementary portion of the new optical signal;

transmitting, by the transmitter, the at least two signal slices to a receiver via a first channel and a second channel;

receiving, by a receiver, the at least two signal slices; and using nonlinear mixing, at the receiver, to combine the at least two signal slices to recover the new optical signal.

11. The method of claim 10 further comprising:

identifying, at the transmitter, a spacing frequency between each of the at least two available channels;

transmitting, by the transmitter, the spacing frequency to the receiver; and receiving, by the receiver, the spacing frequency, wherein using the nonlinear mixing to combine the at least two signal slices includes using the nonlinear mixing to combine the at least two signal slices further based on the spacing frequency.

12. The method of claim 10 wherein using the nonlinear mixing to combine the at least two signal slices includes comb-based wavelength conversion using similar comb lines as the pair of spacing coherent optical frequency comb lines.

13. The method of claim 10 further comprising performing channel equalization to reduce inter-symbol-interference of the recovered new optical signal.

14. A system for transmitting an optical signal, comprising:

a transmitter having a comb source configured to generate multiple comb lines and a filter configured to select a first pair of spacing coherent optical frequency comb lines from the multiple comb lines, the transmitter being configured to:

identify at least two available channels in an available optical spectrum each having an available bandwidth, receive a request for a new optical signal having a signal bandwidth that is greater than the available bandwidth of either of the at least two available channels, nonlinearly mix the new optical signal with the first pair of spacing coherent optical frequency comb lines separated by the spacing frequency to create an optical signal copy that is spaced from the new optical signal by the spacing frequency, filter a first slice of the new optical signal and a second slice of the optical signal copy, the first slice representing a first portion of the new optical signal and the second slice representing a second complementary portion of the new optical signal, and transmit the at least two signal slices onto an optical transmission line; and a receiver configured to:

receive the at least two signal slices via the optical transmission line, and use nonlinear mixing to combine the at least two signal slices to recover the new optical signal.

15. The system of claim 14 wherein:

the transmitter is further configured to identify a spacing frequency between each of the at least two available channels and to transmit the spacing frequency to the receiver; and the receiver is configured to nonlinearly mix the at least two signal slices further based on the spacing frequency.

16. The system of claim 14 wherein the receiver is further configured to nonlinearly mix the at least two signal slices using comb-based wavelength conversion using similar comb lines as the pair of spacing coherent optical frequency comb lines.

17. The system of claim 14 wherein the receiver is further configured to perform channel equalization on the new optical signal to reduce inter-symbol-interference of the new optical signal.

* * * * *

UNITED STATES PATENT AND TRADEMARK OFFICE
CERTIFICATE OF CORRECTION

PATENT NO. : 10,277,326 B2
APPLICATION NO. : 15/890211
DATED : April 30, 2019
INVENTOR(S) : Yinwen Cao et al.

Page 1 of 1

It is certified that error appears in the above-identified patent and that said Letters Patent is hereby corrected as shown below:

In the Specification

Column 1, Line 14 before "BACKGROUND", please add the following paragraph:
"STATEMENT AS TO FEDERALLY SPONSORED RESEARCH
This invention was made with government support under 70NANB16H012 awarded by the National Institute of Standards and Technology, and ECCS1202575, and EEC0812072 awarded by the National Science Foundation. The government has certain rights in the invention."

Signed and Sealed this
Third Day of June, 2025

Coke Morgan Stewart
*Acting Director of the United States Patent and Trademark Office*